United States Patent [19]
Neil et al.

[11] Patent Number: 6,122,111
[45] Date of Patent: Sep. 19, 2000

[54] HIGH PERFORMANCE ZOOM LENS SYSTEM

[75] Inventors: Iain A. Neil, Calabasas, Calif.; Ellis I. Betensky, Toronto, Canada

[73] Assignee: Panavision, Inc., Woodland Hills, Calif.

[21] Appl. No.: 09/044,521

[22] Filed: Mar. 19, 1998

Related U.S. Application Data

[60] Provisional application No. 60/053,743, Jul. 25, 1997.

[51] Int. Cl.$^7$ .................................................. G02B 15/14
[52] U.S. Cl. ............................................ 359/689; 359/747
[58] Field of Search ...................................... 359/680–800

[56] References Cited

U.S. PATENT DOCUMENTS

| | | | |
|---|---|---|---|
| 3,705,759 | 12/1972 | Cook et al. .............................. | 350/184 |
| 4,099,846 | 7/1978 | Kawamura et al. ..................... | 350/186 |
| 4,447,135 | 5/1984 | Nakamura ............................... | 350/426 |
| 5,253,113 | 10/1993 | Sekita et al. ............................ | 359/680 |
| 5,325,236 | 6/1994 | Tanaka .................................... | 359/689 |
| 5,416,639 | 5/1995 | Yamanashi .............................. | 359/683 |
| 5,504,626 | 4/1996 | Oshikiri .................................. | 359/689 |
| 5,638,215 | 6/1997 | Neil ........................................ | 359/665 |

FOREIGN PATENT DOCUMENTS

| | | |
|---|---|---|
| 25 33 194 | 2/1976 | Germany . |
| 2 253 281 | 9/1992 | United Kingdom . |

OTHER PUBLICATIONS

"International Lens Design Conference", Jun. 11/14, 1990, vol. 1354—SPIE.

"Lens And Optical Systems Design"; Sep. 14–18, 1992, vol. 1780—SPIE.

"Ultrahigh Performance Close–Focusing Large–Ratio Zoom Lens For The Visible Waveband"; OSA Proceedings of the International Optical Design Conference, 1994, vol. 22, Iain Neil and Mel Kreitzer.

"Zoom lenses"; Jul. 11–12, 1995, vol. 2539—SPIE.

Proceedings of the 22$^{nd}$ Optics Symposium (Japan), Jun. 26, 1997, "Design, Production and Evaluation of Optical Systems and Material".

Patent Abstract of JP 08 005921 A, Dec. 1, 1996.

*Primary Examiner*—Georgia Epps
*Assistant Examiner*—Younggil T. Lee
*Attorney, Agent, or Firm*—Lyon & Lyon LLP

[57] ABSTRACT

A high performance zoom lens system formed by multiple focus lens groups, multiple zoom lens groups and single auxiliary lens group aligned in that order on a common optical axis and arranged to collect radiation emanating from an object space and deliver that radiation to an axially stationary real image in an image space, such as on a film plane or video CCD. The multiple focus lens groups comprise a first focus lens group of negative optical power that is axially movable and contains at least one non-spherical, non-plano, optically refractive surface, and a second focus lens group of positive optical power that is axially movable. The multiple zoom lens groups comprise a first zoom lens group of negative optical power that is axially movable, and a second zoom lens group of positive optical power that is axially movable and contains an optical stop or iris. The single auxiliary lens group is of relatively weak positive optical power compared to the other lens groups, is axially stationary and contains at least one non-spherical, non-plano optically refractive surface. The remaining optically refractive surfaces of said zoom lens system being substantially spherical or plano. By axial positioning of said multiple focus lens groups and said multiple zoom lens groups, the zoom lens system provides a high level of optical performance at said real image through its entire and substantial focusing and zooming ranges.

37 Claims, 3 Drawing Sheets

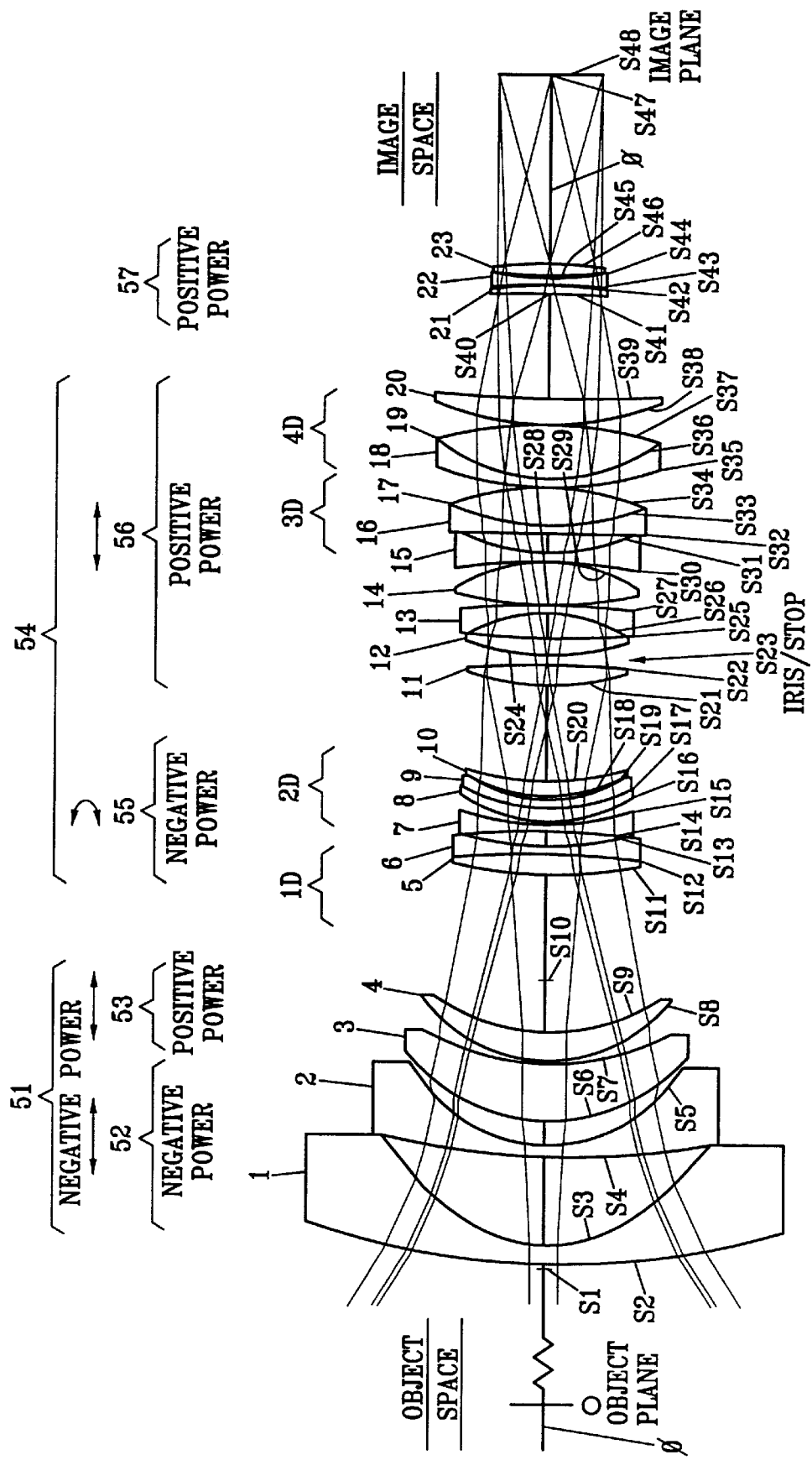

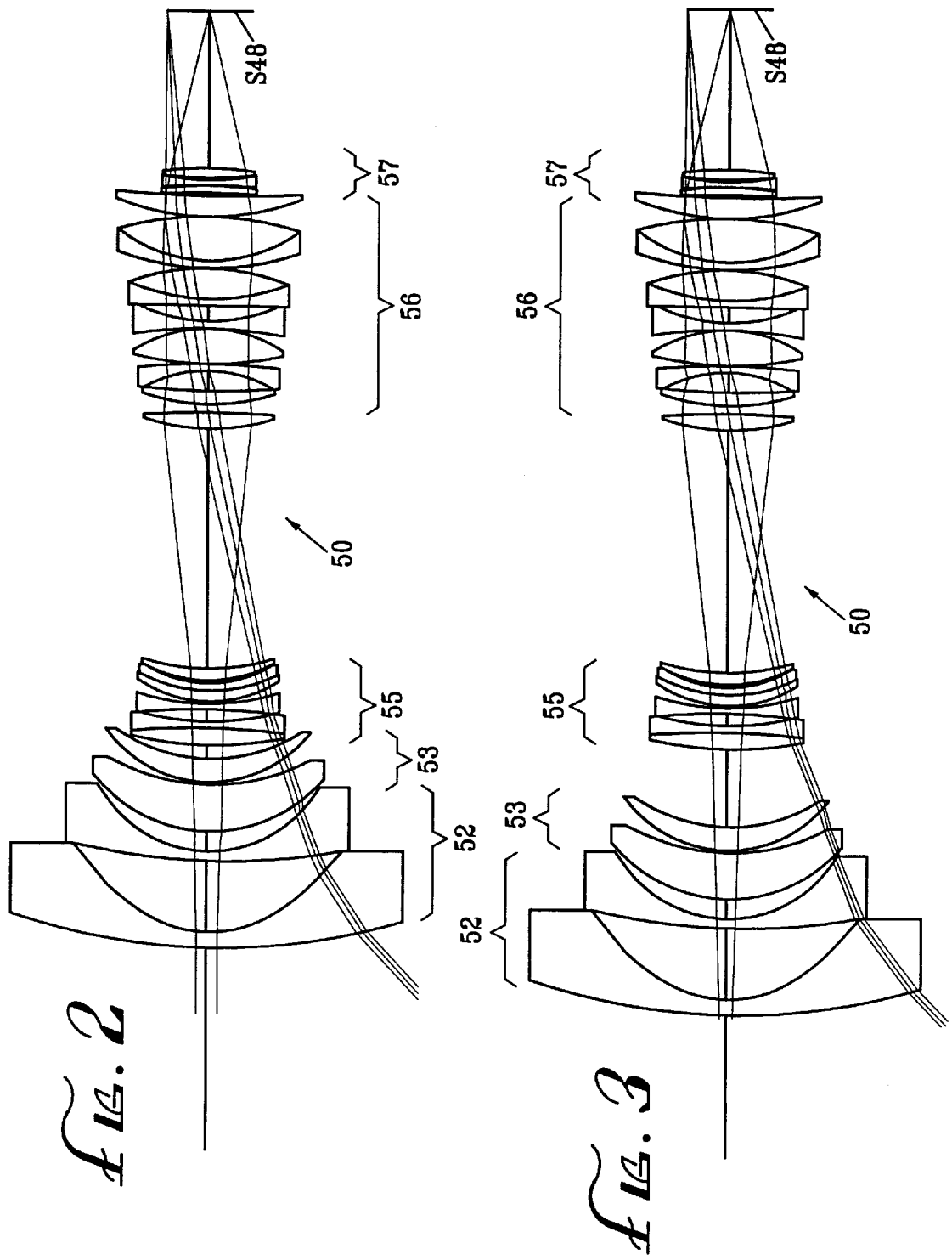

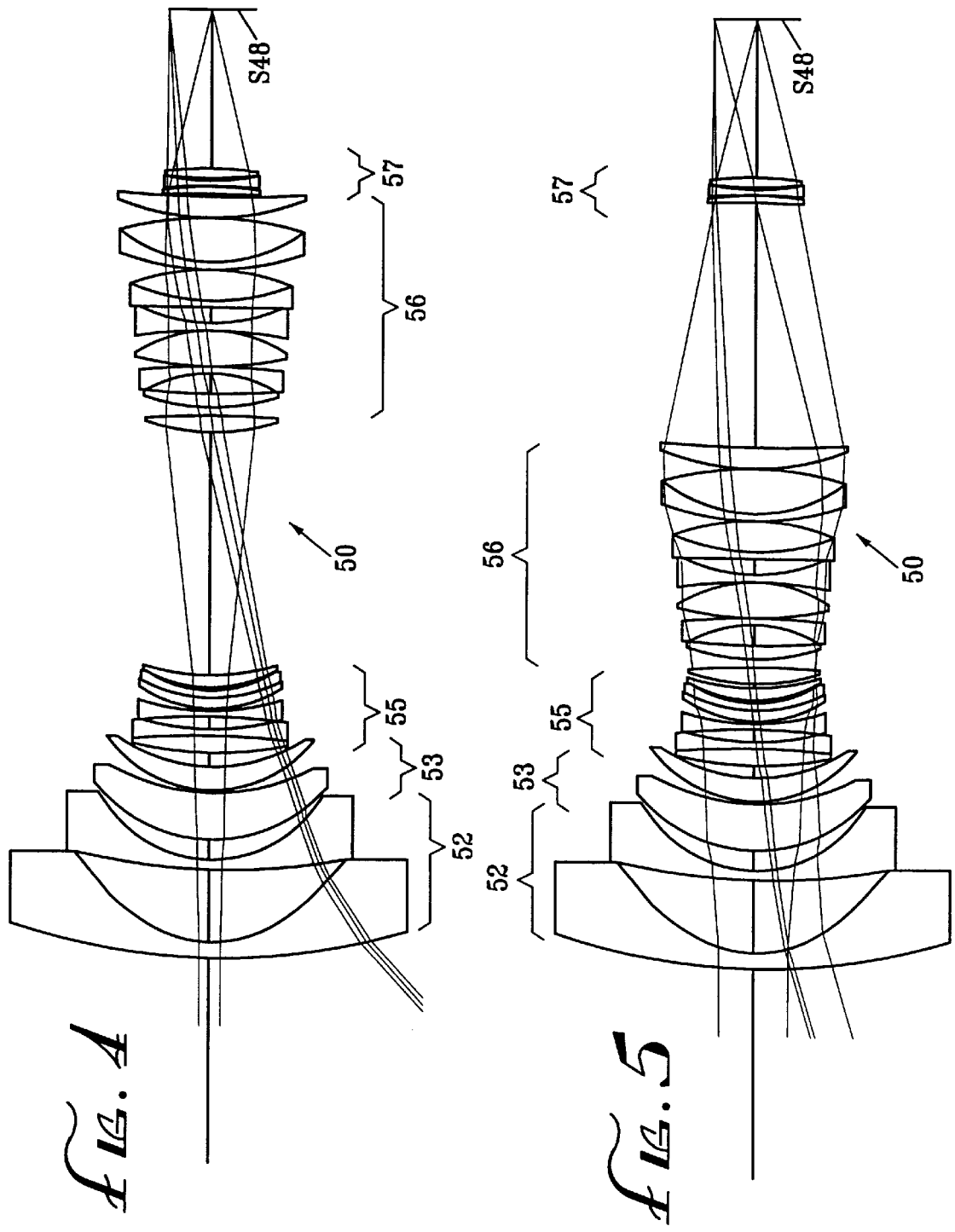

HIGH PERFORMANCE ZOOM LENS SYSTEM

This is a nonprovisional application based on and claims priority from the provisional application filed Jul. 25, 1997, Ser. No. 60/053,743.

This invention relates to an optical objective lens system for cameras and, in particular, to a high performance zoom lens system that produces a high quality image over the full zoom range.

High performance optical systems, such as for cinematography, high definition television ("HDTV") and advanced television ("ATV") require superior optical characteristics and performance which is normally accomplished by using separate objective lenses of different fixed focal lengths for achieving different photographic functions that are determined or influenced by the focal length. There are cinematographic advantages to using zoom lenses to vary the effective focal length of the objective lens without the necessity of changing objective lenses and also there is possible reduction in the cost over having several different lenses, particularly within the normal range of desired focal lengths that might be used in photographing normal scenes which require a range from very wide angle to standard focal lengths. However, previously available zoom lenses have one or more undesirable limitations such as the range of focal lengths, the inability to focus adequately over the entire focal length range, the inability to focus on close objects, the lack of adequate optical performance over the entire focal length range and focus distance, the cost, the large size and the like.

It is an object of this invention to provide a high performance zoom lens system that provides optimum optical performance over the entire zoom focal length range and at focus distances from very close to infinity. Specifically, it is an object of this invention to provide such a zoom lens system having a focal length zoom region from about 14.5 mm to 50 mm that has substantially the optical performance of high quality fixed objective lenses of that same range.

Another object of this invention is to provide a high performance zoom lens system comprising multiple focus lens groups, multiple zoom lens groups and a single auxiliary lens group aligned on the optical axis wherein each of the multiple focus lens groups and each of the multiple zoom lens groups are axially movable along the optical axis for focusing and zooming but with the single auxiliary lens group and the real image plane of the camera remaining at fixed locations. A still further object is to provide such a zoom lens system wherein the basic power configuration of the multiple focus lens group is negative.

BRIEF DESCRIPTION OF THE DRAWINGS

FIG. 1 is an optical diagram of the high performance zoom lens system of the present invention; and FIGS. 2–5 are optical diagrams of the zoom lens system of FIG. 1 illustrating different positions of the focus lens groups and zoom lens groups to produce different focal lengths and focus distances.

DESCRIPTION OF A PREFERRED EMBODIMENT OF THE INVENTION

A preferred embodiment of the present invention will now be described by way of a design example with accompanying figures and tables. Referring first to FIG. 1, each lens element is identified by a numeral from 1 through 23 and the general configuration of each lens element is depicted, but the actual radius of each lens surface is set forth below in a table. The lens surfaces, including dummy optical surfaces used for design calculation purposes, are identified by the letter "S" followed by a numeral from S1 through S48.

Each lens element has its opposite surfaces identified by a separate but consecutive surface number as, for example, lens element 1 has lens surfaces S2 and S3, lens element 11 has lens surfaces S21 and S22 and so forth, as shown in FIG. 1, except that for doublet lens components 1D, 2D, 3D and 4D the coincident facing lens surfaces are given a single surface number. For example, doublet 1D is comprised of lens element 5 having a front lens surface S11 and a rear lens surface S12 and lens element 6 having a front lens surface S12 (coincidental) and a rear lens surface S13. The location of the object to be photographed, particularly as it relates to focus distance, is identified by a vertical line and the letter "O" on the optical axis, dummy optical surfaces that are used in the optical data tables are identified by the vertical lines numbered S1, S10, S40 and S47, and the real image surface is identified by the numeral S48. Dummy surface S47 used for making the calculations substantially coincides with real image surface S48 at all positions of the focus and zoom lens groups. All of the lens surfaces are spherical except lens surfaces 3 and 44 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 50, of this invention. Beginning from the end facing the object O to be photographed, i.e. the left end in FIG. 1, the focus lens group 51 comprises a first focus lens group 52 comprised of lens elements 1 and 2, and a second focus lens group 53 comprised of lens elements 3 and 4. A zoom lens group 54 comprises a first zoom lens group 55 that functions as a zoom compensator and a second lens group 56 that functions as a zoom variator. The zoom compensator 55 includes, from left to right in FIG. 1, a first doublet lens component 1D comprised of lens elements 5 and 6, a singlet lens element 7, a second doublet lens component 2D comprised of lens elements 8 and 9, and a singlet lens element 10. The zoom variator 56 includes, from left to right in FIG. 1, singlet lens element 11, an adjustable optical stop (iris) S23, singlet lens elements 12–15, a first doublet lens component 3D comprising lens elements 16 and 17, a second doublet lens component 4D comprising lens elements 18 and 19, and a singlet lens element 20. The auxiliary lens group 57 is comprised of singlet lens elements 21, 22 and 23.

The positive or negative power of each lens element is set forth below in TABLE 1. The resultant optical power of each subgroup of lenses is as follows; the first focus group 52 is negative, the second focus group 53 is positive, the zoom compensator 55 is negative, the zoom variator 56 is positive, and the auxiliary lens group 57 is weakly positive. The combined optical power of the focus lens group 51 is negative.

Each of the lens groups 52, 53, 55 and 56 are movable in both directions along the optical axis for focusing and zooming. The auxiliary lens group 57 remains stationary and at a fixed distance from the real image surface S48. The horizontal arrows with arrowheads on both ends in the upper portion of FIG. 1 indicate that each of the lens subgroups 52, 53, and 56 is movable in both axial directions but in a monotonic manner (i.e. in only one direction when progressing from one extreme to the other of adjustments) and the half-circle arrow and arrowheads for zoom lens subgroup 55 indicates that its movement is non-monotonic, that is, the movement reverses during zooming in one optical direction, such as from the minimum focal length to the maximum focal length.

While only the lens elements are physically shown in FIG. 1, it is to be understood that conventional mechanical devices and mechanisms are provided for supporting the lens elements and for causing axial movement of the movable lens groups in a conventional lens housing or barrel.

The lens construction and fabrication data for the above described zoom lens system 50 is set forth below in TABLE 1, which is extracted from data produced by CODE V® optical design software that is commercially available from Optical Research Associates, Inc., Pasadena, Calif., U.S.A., which was also used for producing the optical diagrams FIGS. 1–5. All of the data in TABLE 1 is given at a temperature of 20° C. (68° F.) and standard atmospheric pressure (760 mm Hg). Throughout this specification, including the Tables, all measurements are in millimeters (mm) with the exception of wavelengths which are in nanometers (nm). In TABLE 1, the first column "ITEM" identifies each optical element and each location, i.e. object plane, dummy surface, etc., with the same numeral or label as used in FIG. 1. The second and third columns identify the "Group" and "Subgroup", respectively, to which that optical element (lens) belongs with the same numerals used in FIG. 1. The fourth column "Surface" is a list of the surface numbers of the object (line "O" in FIG. 1 and "Object Plane" in TABLE 1), the dummy optical surfaces S1, S10, S40 and S47, the Iris (stop) S23 and each of the actual surfaces of the lenses, as identified in FIG. 1. The fifth and sixth columns "Focus Position" and "Zoom Position", respectively, identify three typical focus positions (F1, F2 and F3) of the focus lens groups 52 and 53 and four typical positions (Z1, Z2, Z3 and Z4) of the zoom lens group 55 and 56 wherein there are changes in the distance (separation) between some of the surfaces listed in the fourth column, as described below more thoroughly. The seventh column "Thickness or Separation" is the axial distance between that surface (fourth column) and the next surface, for example, the distance between surface S2 to surface S3 is 5.000 mm. The eighth column, headed by the legend "Radius of Curvature", is a list of the optical surface radius of curvature for each surface, with a minus sign (−) meaning the center of the radius of curvature is to the left of the surface, as viewed in FIG. 1, and "Flat" meaning either an optically flat surface or a dummy optical surface. The asterisk (*) for surfaces S3 and S44 indicate these are aspheric surfaces for which the "radius of curvature" is a base radius, and the formula and coefficients for those two surfaces are set forth as a footnote to TABLE 1 at the * (asterisk). The ninth column "Optical Power" sets forth whether the lens element ("Item" in the first column) is of a positive (Pos.) or negative (Neg.) optical power.

The next three columns of TABLE 1 relate to the "Material" between that surface (fourth column) and the next surface to the right in FIG. 1, with the tenth column "Type" indicating whether there is a lens (Glass) or empty space (Air) between those two surfaces. All of the lenses are glass and the eleventh column "Code" identifies the optical glass. For convenience, all of the lens glass has been selected from glass available from Ohara Corporation and the twelfth column "Name" lists the Ohara identification for each glass type, but it is to be understood that any equivalent or adequate glass may be used.

The last column of TABLE 1 headed "Maximum Aperture Diameter" provides the maximum diameter for each surface through which the light rays pass. All of the maximum aperture diameters, except for the Iris surface S23, are given at a wavelength of 546.1 nanometers for a maximum image height of 14.45 mm and a constant f-number of f/2.2 at the Image Plane, for all Focus and Zoom Positions. The maximum aperture diameter of the Iris surface S23 is given in TABLE 1 at a wavelength of 546.1 nanometers and an f-number of f/2.2 at the Image Plane for Zoom Position Z4. For Zoom Positions 1, 2 and 3 the maximum aperture diameters at the Iris surface S23 at a wavelength of 546.1 nanometers and an f-number of f/2.2 at the Image Plane are 29.30 mm, 33.35 mm and 39.26 mm, respectively. At the Image Plane S48, the Maximum Aperture Diameter is given as a paraxial value.

TABLE I

OPTICAL PRESCRIPTION

| Item | Group | Subgroup | Surface | Focusing Position | Zoom Position | Thickness or Separation (mm) | Radius of Curvature (mm) | Optical Power | Material Type | Code | Name | Maximum Aperture Diameter (mm) |
|---|---|---|---|---|---|---|---|---|---|---|---|---|
| Object Plane | | | 0 | F1 | All | Infinite | Flat | | Air | | | |
| | | | | F2 | All | 330.000 | | | | | | |
| | | | | F3 | All | 133.000 | | | | | | |
| Dummy Surface | | | S1 | All | All | 1.000 | Flat | | Air | | | |
| 1 | 51 | 52 | S2 | All | All | 5.000 | 218.818 | Neg. | Glass | 438950 | FPL53 | 124.80 |
| | | | S3 | All | All | 23.534 | 38.506* | | Air | | | 90.57 |
| 2 | 51 | 52 | S4 | All | All | 3.800 | 222.116 | Neg. | Glass | 618634 | PHMS2 | 90.24 |
| | | | S5 | F1 | All | 5.300 | 43.328 | | Air | | | 73.22 |
| | | | | F2 | All | 6.322 | | | | | | |
| | | | | F3 | All | 7.260 | | | | | | |
| 3 | 51 | 53 | S6 | All | All | 15.592 | 51.336 | Pos. | Glass | 805254 | PBH6W | 73.95 |
| | | | S7 | All | All | 0.100 | 77.033 | | Air | | | 68.33 |
| 4 | 51 | 53 | S8 | All | All | 7.697 | 43.190 | Pos. | Glass | 438950 | FPLS3 | 64.89 |
| | | | S9 | F1 | All | 4.431 | 55.573 | | Air | | | 62.41 |
| | | | | F2 | All | 14.508 | | | | | | |
| | | | | F3 | All | 24.155 | | | | | | |

TABLE I-continued

OPTICAL PRESCRIPTION

| Item | Group | Subgroup | Surface | Focusing Position | Zoom Position | Thickness or Separation (mm) | Radius of Curvature (mm) | Optical Power | Material Type | Code | Name | Maximum Aperture Diameter (mm) |
|---|---|---|---|---|---|---|---|---|---|---|---|---|
| Dummy Surface | | | S10 | All | Z1 | 0.109 | Flat | | Air | | | |
| | | | | All | Z2 | 27.982 | | | | | | |
| | | | | All | Z3 | 9.423 | | | | | | |
| | | | | All | Z4 | 0.100 | | | | | | |
| 5 | 54 | 55 | S11 | All | All | 5.181 | 129.546 | Pos. | Glass | 636354 | PBM6 | 48.90 |
| 6 | 54 | 55 | S12 | All | All | 2.200 | −318.127 | Neg. | Glass | 804396 | LAH63 | 47.92 |
| | | | S13 | All | All | 3.871 | 97.742 | | Air | | | 45.43 |
| 7 | 54 | 55 | S14 | All | All | 2.170 | −515.815 | Neg. | Glass | 762401 | LAM55 | 45.15 |
| | | | S15 | All | All | 0.700 | 86.505 | | Air | | | 44.15 |
| 8 | 54 | 55 | S16 | All | All | 3.560 | 44.464 | Pos. | Glass | 847239 | PBH53W | 44.47 |
| 9 | 54 | 55 | S17 | All | All | 2.000 | 56.665 | Neg. | Glass | 806410 | LAH53 | 43.55 |
| | | | S18 | All | All | 1.380 | 38.814 | | Air | | | 41.81 |
| 10 | 54 | 55 | S19 | All | All | 3.799 | 47.058 | Pos. | Glass | 805254 | PBH6W | 41.84 |
| | | | S20 | All | Z1 | 81.386 | 70.812 | | Air | | | 41.17 |
| | | | | All | Z2 | 26.018 | | | | | | |
| | | | | All | Z3 | 3.205 | | | | | | |
| | | | | All | Z4 | 0.971 | | | | | | |
| 11 | 54 | 56 | S21 | All | All | 5.284 | 73.576 | Pos. | Glass | 618634 | PHM52 | 41.12 |
| | | | S22 | All | All | 1.300 | −467.060 | | Air | | | 41.10 |
| Iris | 54 | 56 | S23 | All | All | 1.320 | Flat | | Air | | | 40.98 |
| 12 | 54 | 56 | S24 | All | All | 4.599 | 64.719 | Pos. | Glass | 618634 | PHM52 | 42.20 |
| | | | S25 | All | All | 6.476 | 280.545 | | Air | | | 41.99 |
| 13 | 54 | 56 | S26 | All | All | 2.150 | −44.031 | Neg | Glass | 804466 | LAH65 | 41.96 |
| | | | S27 | All | All | 0.100 | −276.492 | | Air | | | 44.73 |
| 14 | 54 | 56 | S28 | All | All | 11.912 | 104.569 | Pos. | Glass | 438950 | FPL53 | 47.12 |
| | | | S29 | All | All | 0.100 | −45.864 | | Air | | | 47.81 |
| 15 | 54 | 56 | S30 | All | All | 2.200 | −125.907 | Neg. | Glass | 734515 | LAL59 | 47.23 |
| | | | S31 | All | All | 4.979 | 63.152 | | Air | | | 48.06 |
| 16 | 54 | 56 | S32 | All | All | 2.250 | 14624.000 | Neg. | Glass | 720347 | BPH8 | 48.29 |
| 17 | 54 | 56 | S33 | All | All | 9.972 | 84.356 | Pos. | Glass | 603655 | PHM53 | 51.41 |
| | | | S34 | All | All | 0.100 | −87.065 | | Air | | | 52.55 |
| 18 | 54 | 56 | S35 | All | All | 2.550 | 88.905 | Neg. | Glass | 521526 | SSL5 | 57.81 |
| 19 | 54 | 56 | S36 | All | All | 14.288 | 56.430 | Pos | Glass | 438950 | FPL53 | 58.48 |
| | | | S37 | All | All | 0.100 | −114.090 | | Air | | | 58.93 |
| 20 | 54 | 56 | S38 | All | All | 6.824 | 84.019 | Pos. | Glass | 720460 | LAM61 | 59.41 |
| | | | S39 | All | Z1 | 0.100 | 391.268 | | Air | | | 58.70 |
| | | | | All | Z2 | 27.592 | | | | | | |
| | | | | All | Z3 | 68.959 | | | | | | |
| | | | | All | Z4 | 80.521 | | | | | | |
| Dummy Surface | | | S40 | All | All | 0.600 | Flat | | Air | | | |
| 21 | 57 | | S41 | All | All | 2.527 | 1395.656 | Pos. | Glass | 785257 | PBH11W | 29.97 |
| | | | S42 | All | All | 0.100 | −105.898 | | Air | | | 29.72 |
| 22 | 57 | | S43 | All | All | 1.800 | −220.862 | Neg. | Glass | 901315 | LAH78 | 29.34 |
| | | | S44 | All | All | 0.911 | 72.073* | | Air | | | 28.50 |
| 23 | 57 | | S45 | All | All | 3.169 | 128.877 | Pos. | Glass | 720460 | LAM61 | 28.58 |
| | | | S46 | All | All | 53.300 | "118.373 | | Air | | | 28.75 |
| Dummy Surface | | | S47 | All | All | 0.000 | Flat | | Air | | | |
| Image Plane | | | S48 | All | All | 0.000 | Flat | | Air | | | 28.90 |

\* Surface profiles of aspheric surfaces S3 and S44 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10} + (E)Y^{12}$$

where:

$CURV = 1 / (\text{Radius of Curvature})$ $Y$ = Aperture height, measured perpendicular to optical axis $K, A, B, C, D, E$ = Coefficients $Z$ = Position of surface profile for a given Y value, as measured along the optical axis from the pole (i.e. axial vertex) of the surface.

The coefficients for the surface S3 of lens 1 are:

$K = -1.5066$ $A = 2.0962 \times 10^{-6}$

B=−7.9395×10$^{-10}$
C=6.1324×10$^{-13}$
D=−2.8537×10$^{-16}$
E=3.1072×10$^{-20}$

The coefficients for the surface S44 of lens 22 are:
K=−2.2286
A=2.2871×10$^{-6}$
B=−2.1575×10$^{-9}$
C=9.2167×10$^{-12}$
D=−1.2856×10$^{-14}$
E=0.0

The foregoing footnote * to TABLE 1 includes the equation for calculating the shape of the aspheric surfaces S3 and S44 for the value Z, wherein CURV is the curvature at the pole of the surface, Y is the height or distance from the optical axis of a specific point on the surface of the glass, K is the conic coefficient, and A, B, C, D, and E are the 4th, 6th, 8th, 10th and 12th, respectively, order deformation coefficients which are a well known equation and values for calculating the shape of an aspheric surface.

From the specifications for the individual lens elements (Items 1–23) and the separation between lens elements set forth in TABLE 1, the focal lengths of each lens element and then each group of lens elements (i.e. focus lens groups 52 and 53, zoom lens groups 55 and 56, and auxiliary lens group 57) may be calculated by using the aforementioned CODE V® optical design software, and those calculated group focal lengths are as follows:

Focus lens group 52 (Items 1 and 2)=−42.473;
Focus lens group 53 (Items 3 and 4)=107.158;
Zoom lens group 55 (Items 5–10)=−97.783;
Zoom lens group 56 (Items 11–20)=65.115; and
Auxiliary lens group 57 (Items 21–23)=313.093.

The very long focal length (313.093) of the auxiliary lens group 57 indicates that it is weakly powered, as noted above, since the optical "power" of a lens or lens group is the reciprocal of the focal length (power=1÷focal length) and the "modulus of the optical power" is the absolute value (i.e. positive) of the power. Also, the modulus of the power of the auxiliary lens group is substantially smaller (i.e. the focal length is longer) than each of the other four groups 52, 53, 55 and 56.

It should be noted from TABLE 1 that the back focal length (BFL), which is the distance from the last optically refracting surface S46 to the real image surface S48 remains constant in all focus and zoom conditions that the lens system 50 can provide because the auxiliary lens group 57 is in a fixed position and the design of the lens system 50 is predicated on the facts that the real image surface S48 is in a fixed axial position and the image surface is flat.

Also, it should be noted that the zoom lens system 50 is provided with two aperture/field stops at the surfaces S11 and S44 which control the diameter of the aperture through which light rays may pass at each of those points to thereby cause any light rays in the zoom lens system radially beyond those diameters to be stopped.

The four lens groups 52, 53, 55 and 56 are each axially movable independently and their respective movements are coordinated by any convenient means, such as conventional mechanical devices such as cams or the like, to accomplish the desired focusing and zooming functions. The focus lens groups 52 and 53 move independently of the zoom lens groups 55 and 56. The respective axial movements of the first and second focus lens groups 52 and 53 are coordinated. Although the zoom lens groups 55 and 56 always move at the same time and are coordinated, the zoom variator 56 moves in only one direction (monotonic) while progressing from the minimum focal length to the maximum focal length range but the zoom compensator moves in one direction and then the other direction (non-monotonic) in the minimum to maximum focal length range.

Referring to TABLE 1, for illustrating the scope and versatility of the present invention there are three different Focus Positions F1, F2 and F3 and four different Zoom Positions set forth in the data which, in effect, provides specific data for twelve (3×4=12) different combinations of positions for the four movable lens groups. For Focus Position F1 the Object Plane O is assumed to be at infinity, for F2 the Object Plane is at an intermediate distance of about 330 mm, and for F3 the Object Plane O is at a close distance of about 133 mm. At each of these three Focus Positions F1, F2 and F3, the focus lens group 52 and 53 remain in the same respective positions throughout the full ranges of movement of the zoom lens groups 55 and 56 (indicated by "All" in the Zoom Position column of TABLE 1). Similarly, for each of the four Zoom Positions Z1, Z2, Z3 and Z4 set forth in TABLE 1, the zoom lens groups 55 and 56 remain in the same respective positions throughout the full ranges of movement of the focus lens groups 52 and 53 (indicated by "All" in the Focus Position column of TABLE 1). For example, for Focus Position F1 the distance (Thickness or Separation column) to the next surface to the right in FIG. 1 from the Object Plane O is infinity (i.e. focus is at infinity), from S5 is 5.300 mm and from S9 is 4.431 mm, while the variable distances at S10, S20 and S39 are variable over their full ranges for zooming ("All" in the Zoom Position column) on the object to be photographed that is at infinity focus, without changing the focus lens group positions, i.e. spacings at S5 and S9. Similarly, for Focus Position F2 there is an intermediate focus distance to the object O of 330 mm and the spacings at S5 and S9 are 7.260 mm and 14.508 mm, respectively, while the spacings at S10, S20 and S39 for the zoom elements are variable over their full ranges. The Zoom Positions Z1, Z2, Z3 and Z4 are representative of four positions of the zoom lens groups 55 and 56 with Zoom Positions Z1 and Z4 being the extreme positions and Z2 and Z3 being intermediate positions for all focus lens group positions. The focal length of the lens system 50 varies for different focus distances and Zoom Positions and, for example, at infinity focus and for Zoom Position Z1 the focal length is 15.3 mm, for Zoom Position Z2 the focal length is 23.9 mm, for Zoom Position Z3 the focal length is 42.5 mm, and for Zoom Position Z4 the focal length is 49.2 m. Of course, it will be understood that continuous focusing is available between the extreme Focus Positions F1 and F3, that continuous zooming is available between the extreme Zoom Positions Z1 and Z4, and that any combination of continuous focusing and zooming is available within the described focus and zoom ranges with the lens system 50.

In the event that a very close focus or macro operation of the zoom lens system 50 is desired, the zoom range focal length may be reduced to about 20 mm to 50 mm with continuous focusing which range reduction removes the loss of field of view that would occur with the range of 14.5 to 50 mm but normally the smaller focal length range will be acceptable because of the very large field of view produced by the lens system 50. In other words, the design of the zoom lens system 50 is for an image height of 14.45 mm, which is the so-called Academy 35 mm Cine film format that is rarely used at present and, therefore, the reduction in the smaller focal length range will not seriously affect the conventional 35 mm Cine film format of about 12 mm height. Even a smaller focal length than 20 mm might be achieved but there is a possibility of vignetting which, however, may be avoided by reducing the zoom range between Zoom Positions Z1 and Z2 and by accepting a smaller image, which normally is acceptable. For example, one possible close/macro focus of approximately a two inch focus distance, the focusing data in TABLE 1 for "Thickness or Separation" would be 59.137 for surface "O" (i.e. the distance to the object plane "O" from dummy surface S1), 34.155 for surface S9 and 8.558 for surface S5.

Referring now to FIGS. 2–5, the zoom lens system 50 is shown with the focus lens groups and zoom lens groups in various positions and with light ray traces for those positions. FIGS. 2 and 4 represent the focus position F1 and zoom position Z1 for which data is set forth above in TABLE 1 with infinity focus and a small focal length. FIG. 3 represents the focus position F3 and zoom position Z1 from TABLE 1 with a close focus and small focal length and is shown juxtaposed to FIG. 2 for comparing the relative positions of the focus and zoom lens groups 52, 53, 55 and 56, as well as the differences and similarities of the light ray traces. FIG. 5 represents the focus position F1 and zoom position Z4 from TABLE 1 with infinity focus and a large focal length and is shown juxtaposed to FIG. 4 for the same comparisons. Specifically, it should be noted from FIGS. 2–5 that the pair of light ray traces closest to the axis from object space (at the left in the Figs.) converge to the optical axis at the image space. FIG. 1 represents the focus position F2 and zoom position Z2 from TABLE 1 with intermediate focus distance and focal length.

Normally, the iris of a lens system is located behind (to the right in FIGS. 1–5) of the last moving lens group but zoom lens system 50 has the iris S23 located within the second zoom lens group 56 and therefore the iris S23 moves axially therewith. The size of the aperture of iris S23 is adjusted as the zoom lens group 54 moves axially, as described above, with respect to the maximum aperture diameters listed in TABLE 1.

Also, it should be noted that the size of the aperture of iris S23 is not dependent on the positions of the first and second focus lens groups 52 and 53. By this arrangement, the zoom lens system 50 maintains a constant f-number of about 2.2 in the image space through the zoom range and through the focus range.

The optical performance data of zoom lens system 50 is set forth below in TABLE 2 wherein the diffraction based polychromatic modulation transfer function ("MTF") data is stated in percent (%) for five different Field Positions in seven different combinations of the zoom and focus positions set forth in TABLE 1, as representative examples, as well as the full field distortion data in percent (%) and the full field relative illumination data in percent (%) for those seven combination zoom and focus positions. The Field Positions are set forth in two values, both the actual image height (mm) from the optical axis and the normalized image height, which is the actual image height divided by the maximum image height. The MTF percentages are at the wavelengths and weightings set forth in the righthand column of TABLE 2, namely at 20 cycles/mm, which is a relatively standard measurement of optical performance, wherein the value "20 cycles/mm" means 20 pairs of black and white lines per millimeter on a chart from which the clarity is determined. All of the performance data is given at a temperature of 20° C. (68° F.), standard atmospheric pressure (760 mm Hg), and at F/2.2 full aperture in image space. However, the zoom lens system 50 does provide substantially constant performance, as for example the MTF values, over a temperature range of 0° to 40° C. (32° to 104° F.) and, if a small degradation in performance (MTF) is acceptable, the operable temperature range can be extended to −10° to 50° C. (14° to 122° F.) or more.

TABLE 2

PERFORMANCE DATA

| FIELD POSITIONS | | | | | | | | | |
|---|---|---|---|---|---|---|---|---|---|
| Image Height (mm) | Normalized Image Height | FOCUS POSITIONS (F) AND ZOOM POSITIONS (Z) | | | | | | | PERFORMANCE DATA DESCRIPTION |
| | | F1, Z1 | F1, Z2 | F1, Z4 | F2, Z4 | F3, Z4 | F3, Z1 | F2, Z3 | |
| 0 (Axial) | 0 (Axial) | 82.5 (R) & (T) | 76.6 (R) & (T) | 79.3 (R) & (T) | 82.9 (R) & (T) | 58.9 (R) & (T) | 81.3 (R) & (T) | 80.2 (R) & (T) | Polychromatic diffraction MTF data |
| 5.78 | 0.4 | 80.1 (R) 71.5 (T) | 80.3 (R) 76.7 (T) | 77.7 (R) 70.7 (T) | 88.4 (R) 83.1 (T) | 59.6 (R) 72.1 (T) | 84.4 (R) 77.9 (T) | 75.4 (R) 73.0 (T) | (%) at 20 cycles/mm at fixed position and |
| 8.67 | 0.6 | 77.6 (R) 64.3 (T) | 82.4 (R) 66.5 (T) | 73.4 (R) 70.8 (T) | 85.8 (R) 74.0 (T) | 60.4 (R) 71.1 (T) | 84.1 (R) 66.3 (T) | 70.0 (R) 67.2 (T) | flat image surface and at the following |
| 11.56 | 0.8 | 66.3 (R) 43.6 (T) | 79.9 (R) 62.9 (T) | 71.2 (R) 75.2 (T) | 81.0 (R) 72.4 (T) | 60.1 (R) 62.8 (T) | 69.6 (R) 48.2 (T) | 61.9 (R) 63.0 (T) | wavelengths 643.8, 587.6, 546.1, 486.1 |
| 14.45 (Full Field) | 1 (Full Field) | 80.8 (R) 42.9 (T) | 78.1 (R) 62.0 (T) | 67.5 (R) 49.6 (T) | 78.7 (R) 47.9 (T) | 63.0 (R) 46.2 (T) | 40.1 (T) 55.3 (T) | 54.7 (R) 64.6 (T) | and 455.0 nanometers with respective weightings of 70, 80, 90, 70 and 40, where (R) = radial and (T) = tangential azimuths |
| 14.45 (Full Field) | 1 (Full Field) | −4.5 | −0.7 | +1.4 | +1.3 | +1.2 | −5.0 | +0.9 | Full Field Distortion (%) |
| 14.45 (Full Field) | 1 (Full Field) | 18.5 | 49.6 | 43.7 | 43.8 | 43.9 | 19.7 | 45.2 | Full Field Relative Illumination (%) |

While it would appear that the MTF performance falls-off at full field and somewhat less at 0.8 normalized image height, this is partly attributable to optical field aberrations including, but not limited to, field curvature, astigmatism and lateral color. Since the zoom lens system 50 has been designed to cover the rather large Academy 35 mm Cine image field which is rarely used, in practice these fall-offs are not actually important in real situations where a maximum normalized field of about 0.8 is quite adequate. Further, the apparent MTF performance fall-off at the 0 field position, i.e. on the optical axis, for focus position F3 and zoom position Z4 (a long focal length and a close focus distance of about 133 mm), is not of particular concern because objects at this close of a focus distance will appear to be extremely large which do not require as high a performance MTF as required for objects at greater object space distances. Moreover, the important factor in determining the image quality sharpness characteristics of lenses for Cine use is their contrast capability at all zoom and focus positions. In general, MTF percent modulation (i.e. contrast) values of 80% or more are considered exceptional and values between 50% and 80% are considered very good. From TABLE 2 it can be observed that almost every MTF percent exceeds 50%, except in full field where they all exceed 40%, and that most of the MTF values exceed 70%.

The so-called "breathing" problem of zoom lenses wherein the image changes size from short to long focus is virtually absent in zoom lens system 50. The breathing values due to focusing in percent (%) change of image size are given in TABLE 3 below where it can be observed that the values are relatively small for zoom position Z1 and Z2 (from TABLE 1) as compared to zoom positions Z3 and Z4. Since the depths of field for zoom positions Z1 and Z2 are relatively large as compared to zoom positions Z3 and Z4 the breathing values should be small so that the breathing effect is not noticeable. Of course, the breathing values in zoom positions Z3 and Z4 should ideally be small but if they are not, which is the case here, these effects are not particularly noticeable due to the small depth of field.

TABLE 3

| | BREATHING (%) | | |
|---|---|---|---|
| | F1 | F2 | F3 |
| Z1 | 0 | −2.7 | −3.9 |
| Z2 | 0 | −4.3 | −7.9 |
| Z3 | 0 | −7.0 | −13.4 |
| Z4 | 0 | −8.0 | −15.3 |

The values in TABLE 3 are as measured at a wavelength of 546.1 nanometers based on the difference between the full field principal ray angle (in degrees) at focus position F1 and focus positions F2 and F3, where the full field principal rays at all focus positions produce an image height of 14.45 mm at the image plane.

While the present invention has been described in connection with the zoom lens system 50 that is of the appropriate dimensions for use on a 35 mm Cine motion picture film camera, the dimensions of this zoom lens system may be appropriately scaled up or down for use with various film image formats including, but not limited to, 16 mm, Super 16 mm, 35 mm, 65 mm, IMAX®, OMNIMAX® and the like, and various video formats including high definition television (HDTV), advanced television (ATV) and general digital television.

Among the many advantages of the zoom lens system 50 of this invention is that of providing the wide range of focal lengths that are most commonly used in cine which eliminates the need for at least seven fixed focal length objective lenses for obtaining the proper versatility for high quality cinematography, whereby the use of this zoom lens system will result in greater flexibility and less cost. Further, the unique design of the zoom lens system 50 creates a smaller lens than most high performance zoom lens systems of comparable range of focal lengths and only slightly larger than the largest fixed focal length objective lens in the same range. Still further, the unique lens design of the zoom lens system 50 virtually eliminates the so-called "breathing" problem wherein the image changes size when the focus is changed from short to long focus distances. Other features and advantages of the zoom lens system 50 will appear to those skilled in the art from the foregoing description and the accompanying drawings.

We claim:

1. A high performance zoom lens system comprised of multiple focus lens groups, multiple zoom lens groups and an auxiliary lens group aligned in that order on a common optical axis and arranged to collect radiation emanating from an object space and deliver said radiation to an axially stationary image space as a real image, said multiple focus lens groups comprising a first focus lens group of negative optical power and a second focus lens group of positive optical power, said multiple zoom lens groups comprising a first zoom lens group of negative optical power and a second zoom lens group of positive optical power, each of said first and second focus lens groups and said first and second zoom lens groups being axially movable, and said auxiliary lens group being axially stationary.

2. The high performance zoom lens system of claim 1, wherein said first and second focus lens groups have a combined negative optical power.

3. The high performance zoom lens system of claim 1, wherein said first zoom lens group is axially moved in a non-monotonic manner first in one axial direction and then in the other axial direction over a full range of focal lengths between a minimum focal length and a maximum focal length of the zoom lens system.

4. The high performance zoom lens system of claim 1, wherein said first focus lens group includes a non-spherical, non-plano, optically refractive surface.

5. The high performance zoom lens system of claim 1 or 4, wherein said auxiliary lens group includes a non-spherical, non-plano, optically refractive surface.

6. The high performance zoom lens system of claim 5, wherein said zoom lens system has all remaining optically refractive surfaces that are substantially at least one of either spherical or plano.

7. The high performance zoom lens system of claim 1, wherein said auxiliary lens group has a modulus of optical power smaller than the modulus of optical power of said first focus lens group, second focus lens group, first zoom lens group and second zoom lens group, and said auxiliary lens group is the only auxiliary lens group.

8. The high performance zoom lens system of claim 7, wherein said auxiliary lens group has a positive optical power.

9. The high performance zoom lens system of claim 1, wherein said second zoom lens group includes an adjustable iris.

10. The high performance zoom lens system of claim 1, wherein a fixed optical field stop is provided in said first zoom lens group.

11. The high performance zoom lens system of claim 9, wherein a fixed optical field stop is provided in said first zoom lens group.

12. The high performance zoom lens system of claim 1, 9, 10 or 11, wherein a fixed optical field stop is provided in said auxiliary lens group.

13. The high performance zoom lens system of claim 1, wherein said first and second focus lens groups include lens elements for minimizing changes in a size of objects appearing in the real image during changes in focus distance from close to distant objects by axial movement of said first and second focus lens groups.

14. The high performance zoom lens system of claim 1, wherein said first focus lens group is comprised of at least two optically refractive lens elements and includes at least one aspherical lens surface.

15. The high performance zoom lens system of claim 1 or 14, wherein said second focus lens group is comprised of at least two optically refractive lens elements.

16. The high performance zoom lens system of claim 1, wherein said first zoom lens group is comprised of six optically refractive lens elements of which two pair of doublet lens elements are included.

17. The high performance zoom lens system of claim 1 or 16, wherein said second zoom lens group is comprised of ten optically refractive lens elements of which two pair of doublet lens elements are included.

18. The high performance zoom lens system of claim 1, 14 or 16 wherein said auxiliary lens group is comprised of at least three optically refractive lens elements and includes at least one aspherical lens surface.

19. The high performance zoom lens system of claim 1, wherein the zoom lens system includes a lens element having an aspherical lens surface with a profile governed by the following equation and coefficients;

$$Z = \frac{(CURV)Y^2}{1+(1-(1+K)(CURV)^2Y^2)^{1/2}} + (A)Y^4 + (B)Y^6 + (C)Y^8 + (D)Y^{10} + (E)Y^{12}$$

where:

CURV=1/(Radius of Curvature)

Y=Aperture height, measured perpendicular to optical axis

K,A,B,C,D,E=Coefficients

Z=Position of surface profile for a given Y value, as measured along the optical axis from the pole (i.e. axial vertex) of the surface; and the coefficients for said aspherical lens surface are:

K=−1.5066

A=2.0962×10$^{-6}$

B=−7.9395×10$^{-10}$

C=6.1324×10$^{-13}$

D=−2.8537×10$^{-16}$

E=3.1072×10$^{-20}$.

20. The high performance zoom lens system of claim 19, wherein said aspherical lens surface is included in said first focus lens group.

21. The high performance zoom lens system of claim 1, wherein the zoom lens system includes a lens element having an aspherical lens surface with a profile governed by the following equation and coefficients;

$$Z = \frac{(CURV)Y^2}{1+(1-(1+K)(CURV)^2Y^2)^{1/2}} + (A)Y^4 + (B)Y^6 + (C)Y^8 + (D)Y^{10} + (E)Y^{12}$$

where:

CURV=1/(Radius of Curvature)

Y=Aperture height, measured perpendicular to optical axis

K,A,B,C,D,E=Coefficients

Z=Position of surface profile for a given Y value, as measured along the optical axis from the pole (i.e. axial vertex) of the surface; and the coefficients for said aspherical lens surface are:

K=−2.2286

A=2.2871×10$^{-6}$

B=−2.1575×10$^{-9}$

C=9.2167×10$^{-12}$

D=−1.2856×10$^{-14}$

E=0.0.

22. The high performance zoom lens system of claim 21, wherein said aspherical lens surface is included in said auxiliary lens group.

23. A high performance zoom lens system comprised of multiple focus lens groups, multiple zoom lens groups and a single auxiliary lens group aligned in that order on a common optical axis, said multiple focus lens groups having a first focus lens group of negative optical power and a second focus lens group of positive optical power, each said focus lens group being separately axially moveable along the optical axis, said multiple zoom lens groups comprising a first zoom lens group and a second zoom lens group, said first zoom lens group being axially movable in a non-monotonic manner over a full range between minimum and maximum focal lengths, said second zoom lens group being axially movable in a monotonic manner over the full range between minimum and maximum focal lengths, and said auxiliary lens group being axially stationary.

24. The high performance zoom lens system of claim 23, wherein said first and second focus lens groups have a combined negative optical power.

25. The high performance zoom lens system of claim 23, wherein said first focus lens group includes a non-spherical, non-plano, optically refractive surface.

26. The high performance zoom lens system of claim 23 or 25, wherein said auxiliary lens group includes a non-spherical, non-plano, optically refractive surface.

27. The high performance zoom lens system of claim 23, wherein said auxiliary lens group has a modulus of optical power smaller than the modulus of optical power of said first focus lens group, second focus lens group, first zoom lens group and second zoom lens group, and said auxiliary lens group is the only auxiliary lens group.

28. The high performance zoom lens system of claim 27, wherein said auxiliary lens group has a positive optical power.

29. The high performance zoom lens system of claim 23, wherein said second zoom lens group includes an adjustable iris.

30. The high performance zoom lens system of claim 23, wherein said first and second focus lens groups include lens elements for minimizing changes in a size of objects appearing in the real image during changes in focus distance from close to distant objects by axial movement of said first and second focus lens groups.

31. A high performance zoom lens system comprised of multiple focus lens groups, multiple zoom lens groups and a single auxiliary lens group aligned in that order on a common optical axis and arranged to collect radiation emanating from an object space and deliver said radiation to an axially stationary image space, as a real image, said multiple focus lens groups comprising first and second focus lens groups, said first focus lens group of negative optical power and being axially movable with at least one non-spherical, non-plano, optically refractive surface, said second focus lens group of positive optical power and being axially movable, said multiple zoom lens groups comprising first and second zoom lens groups, said first zoom lens group of negative optical power and being axially movable, said second zoom lens group of positive optical power and being axially movable, said second zoom lens group containing an adjustable optical stop, said single auxiliary lens group being of positive optical power and axially stationary with at least one non-spherical, non-plano optically refractive surface, said zoom lens system having remaining optically refractive surfaces that are substantially at least one of either spherical or plano, and said zoom lens system via axial positioning of said multiple focus lens groups and said multiple zoom lens groups providing a high level of optical performance through focusing and zooming ranges at the real image.

32. The high performance zoom lens system of claim 31, wherein each said non-spherical, non-plano optically refractive surface is an aspherical lens surface.

33. The high performance zoom lens system of claim 31 or 32, wherein said multiple focus lens group has a combined negative optical power.

34. A high performance zoom lens system comprised of glass lens elements 1 through 23 aligned in that order on a common optical axis and arranged to collect radiation emanating from an object space and deliver said radiation to an axially stationary image space as a real image;

said lens elements forming a multiple focus lens group 51 comprising a first focus lens group 52, and a second focus lens group 53, a multiple zoom lens group 54 comprising a first zoom lens group 55 and a second zoom lens group 56, and an auxiliary lens group 57, said first and second focus lens groups and said first and second zoom lens groups each being axially movable;

said first focus lens group comprising lens elements 1 and 2, said second focus lens group comprising lens elements 3 and 4, said first zoom lens group comprising lens elements 5 through 10, said second zoom lens group comprising lens elements 11 through 20, and said auxiliary lens group comprising lens elements 21, 22 and 23; and wherein lens element surfaces, dummy surfaces, an iris, an object plane and an image plane are identified as O and S1 through S48, said lens element surfaces S3 and S44 are aspheric, and said lens elements, lens element surfaces, dummy surfaces, iris, object plane and image plane have the following order, relationships and characteristics:

| Item | Group | Subgroup | Surface | Thickness or Separation (mm) | Radius of Curvature (mm) | Glass Code |
|---|---|---|---|---|---|---|
| Object Plane | | | 0 | Variable | Flat | |
| Dummy Surface | | | S1 | 1.000 | Flat | |
| 1 | 51 | 52 | S2 | 5.000 | 218.818 | 438950 |
| | | | S3 | 23.534 | 38.506 | |
| 2 | 51 | 52 | S4 | 3.800 | 222.116 | 618634 |
| | | | S5 | Variable | 43.328 | |
| 3 | 51 | 53 | S6 | 15.592 | 51.336 | 805254 |
| | | | S7 | 0.100 | 77.033 | |
| 4 | 51 | 53 | S8 | 7.697 | 43.190 | 438950 |
| | | | S9 | Variable | 55.573 | |
| Dummy Surface | | | S10 | Variable | Flat | |
| 5 | 54 | 55 | S11 | 5.181 | 129.546 | 636354 |
| 6 | 54 | 55 | S12 | 2.200 | −318.127 | 804396 |
| | | | S13 | 3.871 | 97.742 | |
| 7 | 54 | 55 | S14 | 2.170 | −515.815 | 762401 |
| | | | S15 | 0.700 | 86.505 | |
| 8 | 54 | 55 | S16 | 3.560 | 44.464 | 847239 |
| 9 | 54 | 55 | S17 | 2.000 | 56.665 | 806410 |
| | | | S18 | 1.380 | 38.814 | |
| 10 | 54 | 55 | S19 | 3.799 | 47.058 | 805254 |
| | | | S20 | Variable | 70.812 | |
| 11 | 54 | 56 | S21 | 5.284 | 73.576 | 618634 |
| | | | S22 | 1.300 | −467.060 | |
| Iris | 54 | 56 | S23 | 1.320 | Flat | |
| 12 | 54 | 56 | S24 | 4.599 | 64.719 | 618634 |
| | | | S25 | 6.476 | 280.545 | |
| 13 | 54 | 56 | S26 | 2.150 | −44.031 | 804466 |
| | | | S27 | 0.100 | −276.492 | |
| 14 | 54 | 56 | S28 | 11.912 | 104.569 | 438950 |
| | | | S29 | 0.100 | −45.864 | |
| 15 | 54 | 56 | S30 | 2.200 | −125.907 | 734515 |
| | | | S31 | 4.979 | 63.152 | |
| 16 | 54 | 56 | S32 | 2.250 | 14624.000 | 720347 |
| 17 | 54 | 56 | S33 | 9.972 | 84.356 | 603655 |
| | | | S34 | 0.100 | −87.065 | |
| 18 | 54 | 56 | S35 | 2.550 | 88.905 | 521526 |
| 19 | 54 | 56 | S36 | 14.288 | 56.430 | 438950 |
| | | | S37 | 0.100 | −114.090 | |

-continued

| Item | Group | Subgroup | Surface | Thickness or Separation (mm) | Radius of Curvature (mm) | Glass Code |
|---|---|---|---|---|---|---|
| 20 | 54 | 56 | S38 | 6.824 | 84.019 | 720460 |
|  |  |  | S39 | Variable | 391.268 |  |
| Dummy Surface |  |  | S40 | 0.600 | Flat |  |
| 21 | 57 |  | S41 | 2.527 | 1395.656 | 785257 |
|  |  |  | S42 | 0.100 | −105.898 |  |
| 22 | 57 |  | S43 | 1.800 | −220.862 | 901315 |
|  |  |  | S44 | 0.911 | 72.073 |  |
| 23 | 57 |  | S45 | 3.169 | 128.877 | 720460 |
|  |  |  | S46 | 53.300 | −118.373 |  |
| Dummy Surface |  |  | S47 | 0.000 | Flat |  |
| Image Plane |  |  | S48 | 0.000 | Flat |  |

35. The high performance zoom lens system of claim 34, wherein the maximum aperture diameters (mm) at each surface S1 through S48, excluding said dummy surfaces, are as follows; 124.80 at S2, 90.57 at S3, 90.24 at S4, 73.22 at S5, 73.95 at S6, 68.33 at S7, 64.89 at S8, 62.41 at S9, 48.90 at S11, 47.92 at S12, 45.43 at S13, 45.15 at S14, 44.15 at S15, 44.47 at S16, 43.55 at S17, 41.81 at S18, 41.84 at S19, 41.17 at S20, 41.12 at S21, 41.10 at S22, 40.98 at S23, 42.20 at S24, 41.99 at S25, 41.96 at S26, 44.73 at S27, 47.12 at S28, 47.81 at S29, 47.23 at S30, 48.06 at S31, 48.29 at S32, 51.41 at S33, 52.55 at S34, 57.81 at S35, 58.48 at S36, 58.93 at S37, 59.41 at S38, 58.70 at S39, 29.97 at S41, 29.72 at S42, 29.34 at S43, 28.50 at S44, 28.58 at S45, 28.75 at S46, 28.90 at S48.

36. The high performance zoom lens system of claim 34, wherein said aspheric lens surface S3 has a profile governed by the following equation and coefficients;

$$Z = \frac{(CURV)Y^2}{1+(1-(1+K)(CURV)^2Y^2)^{1/2}} + (A)Y^4 + (B)Y^6 + (C)Y^8 + (D)Y^{10} + (E)Y^{12}$$

where:

CURV=1/(Radius of Curvature)

Y=Aperture height, measured perpendicular to optical axis

K,A,B,C,D,E=Coefficients

Z=Position of surface profile for a given Y value, as measured along the optical axis from the pole (i.e. axial vertex) of the surface; and the coefficients for said aspheric lens surface are:

K=−1.5066
A=2.0962×10$^{-6}$
B=−7.9395×10$^{-10}$
C=6.1324×10$^{-13}$
D=−2.8537×10$^{-16}$
E=3.1072×10$^{-20}$.

37. The high performance zoom lens system of claim 34 or 36, wherein said aspheric lens surface S44 has a profile governed by the following equation and coefficients;

$$Z = \frac{(CURV)Y^2}{1+(1-(1+K)(CURV)^2Y^2)^{1/2}} + (A)Y^4 + (B)Y^6 + (C)Y^8 + (D)Y^{10} + (E)Y^{12}$$

where:

CURV=1/(Radius of Curvature)

Y=Aperture height, measured perpendicular to optical axis

K,A,B,C,D,E=Coefficients

Z=Position of surface profile for a given Y value, as measured along the optical axis from the pole (i.e. axial vertex) of the surface; and the coefficients for said aspheric lens surface are:

K=−2.2286
A=2.2871×10$^{-6}$
B=−2.1575×10$^{-9}$
C=9.2167×10$^{-12}$
D=−1.2856×10$^{-14}$
E=0.0.

* * * * *